US006883295B1

(12) United States Patent
Negri et al.

(10) Patent No.: US 6,883,295 B1
(45) Date of Patent: Apr. 26, 2005

(54) PROCESS AND PLANT FOR MANUFACTURING DOUBLE-POUCH CONTAINERS

(75) Inventors: Luigi Negri, Sesto San Giovanni (IT); Walter Pinotti, San Felice Sul Panaro (IT); Roberto Tabaroni, Bazzano (IT)

(73) Assignee: Sarong S.p.A., Reggiolo (IT)

( * ) Notice: Subject to any disclaimer, the term of this patent is extended or adjusted under 35 U.S.C. 154(b) by 80 days.

(21) Appl. No.: 09/979,950

(22) PCT Filed: May 5, 2000

(86) PCT No.: PCT/IB00/00599

§ 371 (c)(1),
(2), (4) Date: Mar. 22, 2002

(87) PCT Pub. No.: WO00/73146

PCT Pub. Date: Dec. 7, 2000

(30) Foreign Application Priority Data

May 28, 1999 (IT) .......................... MO99A000120
Dec. 29, 1999 (IT) .......................... MO99A000286

(51) Int. Cl.[7] ............................................. B65B 43/26
(52) U.S. Cl. ............................. 53/459; 53/469; 53/570
(58) Field of Search .................................. 493/186, 210, 493/374, 379, 380, 190; 53/459, 469, 570

(56) References Cited

U.S. PATENT DOCUMENTS 4,254,910 A 3/1981 Martin
5,454,207 A * 10/1995 Storandt ....................... 53/410
5,724,789 A 3/1998 Corella
6,101,791 A * 8/2000 Louviere ...................... 53/467
6,209,291 B1 * 4/2001 Delen et al. .................. 53/450
6,269,616 B1 * 8/2001 Plefka et al. ................. 53/562
6,332,305 B1 * 12/2001 Takahashi .................... 53/551

FOREIGN PATENT DOCUMENTS

FR          2 755 673 A1    11/1996
WO      WO 98/26997 A2       6/1998

OTHER PUBLICATIONS

Patent Abstracts of Japan, vol. 014 No. 052 (M-0928), Jan. 30, 1990 & JP 01 279006 (Shimadaya Honten et al.) Nov. 9, 1989.

* cited by examiner

Primary Examiner—Eugene Kim
(74) Attorney, Agent, or Firm—Browdy and Neimark, P.L.L.C.

(57) ABSTRACT

In the process and plant for forming double-pouch containers, two continuous external ribbons (3), facing one another, are fed in an advancement direction to an infeeding zone where a third, central ribbon (5) is inserted between the external ribbons (3). The pouches are formed by injecting a forming fluid between the external ribbons (3) in order to determine an expansion thereof against compartments of two half-molds having a shape which corresponds to a final pouch shape. Each container has two similar pouches, one facing another, which are defined by a pair of external walls and by a central wall coupled along a perimeter thereof to the external walls. The process enables rapid and economical formation of double-pouch containers.

18 Claims, 6 Drawing Sheets

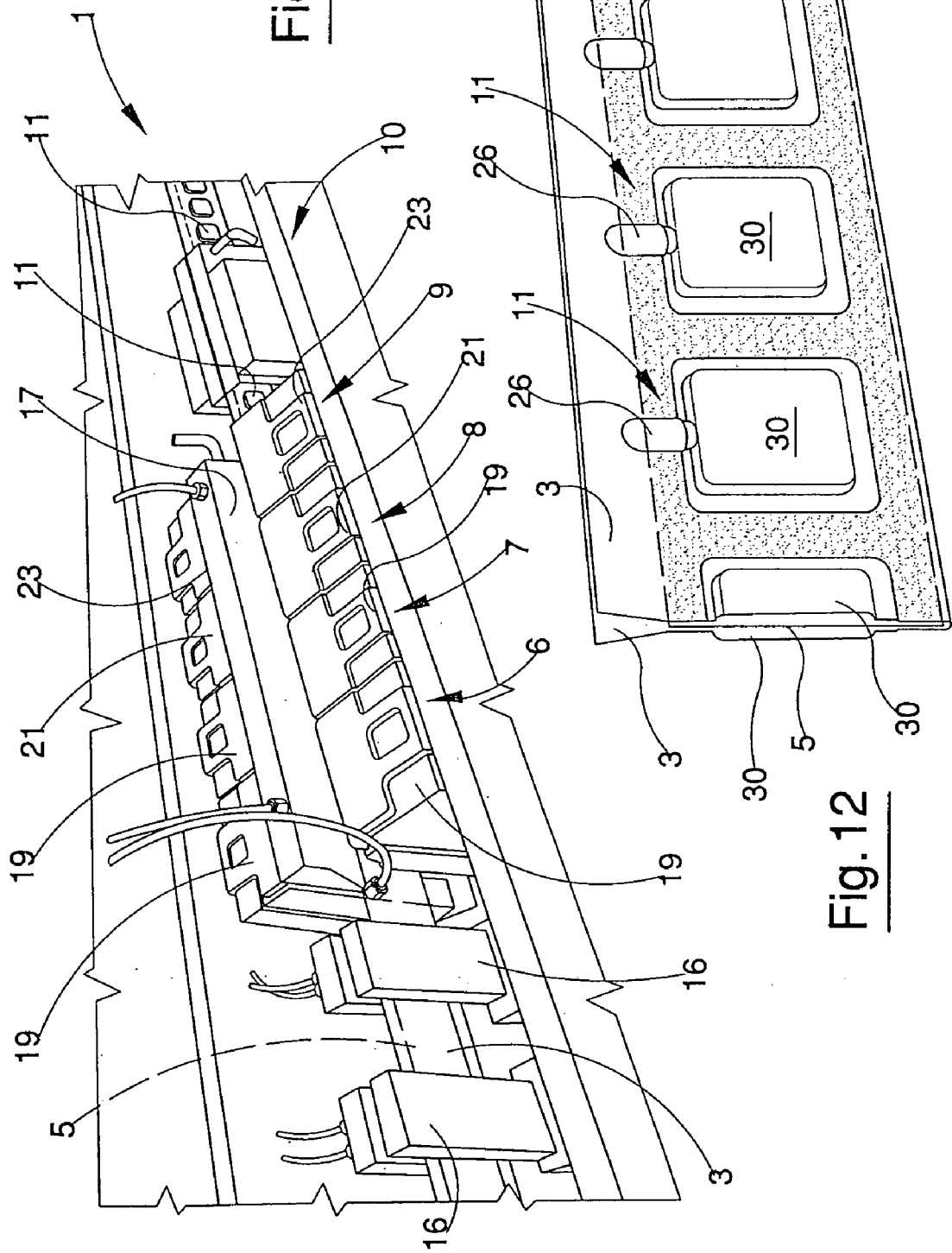

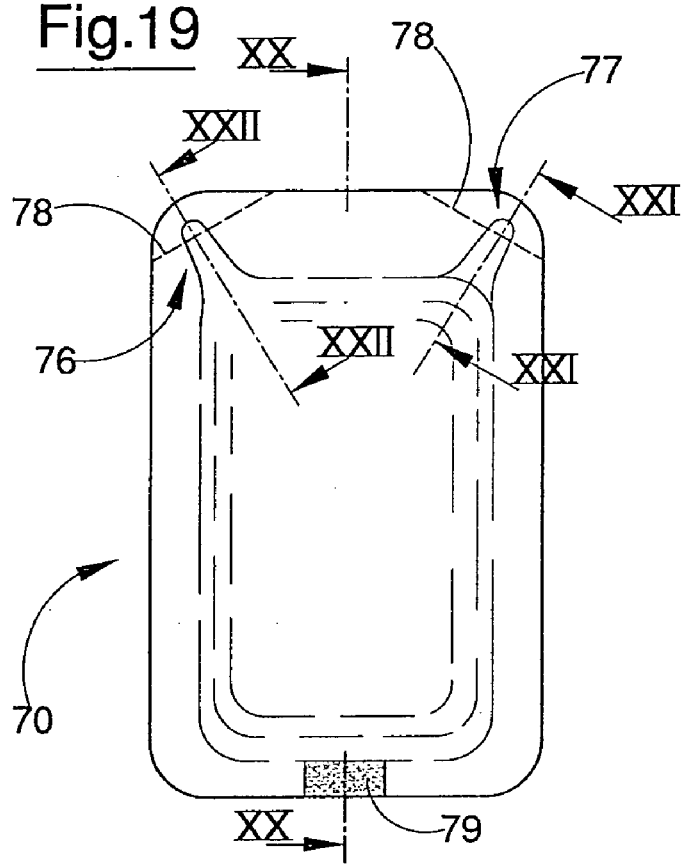
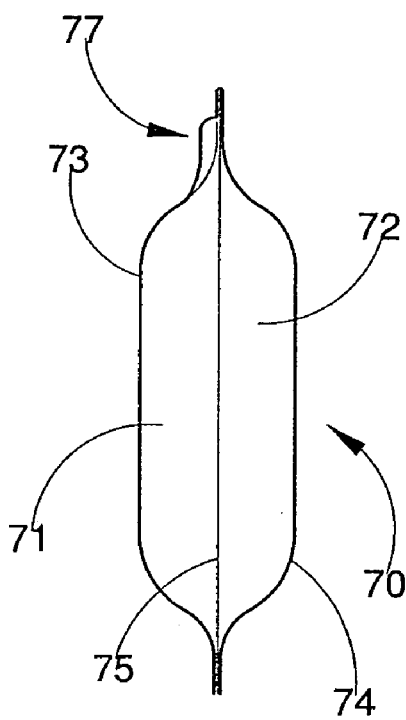
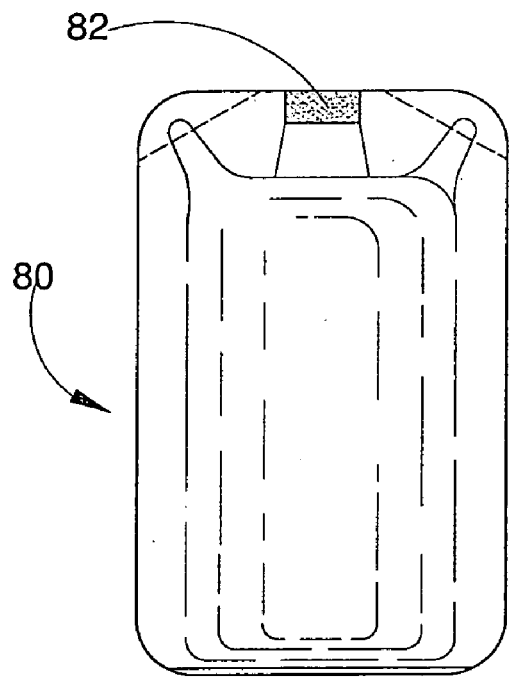
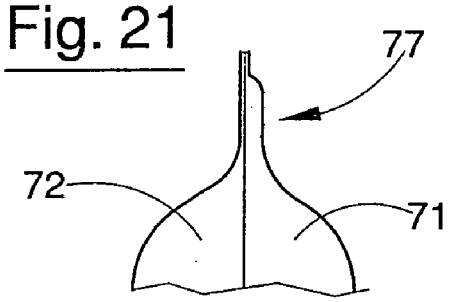
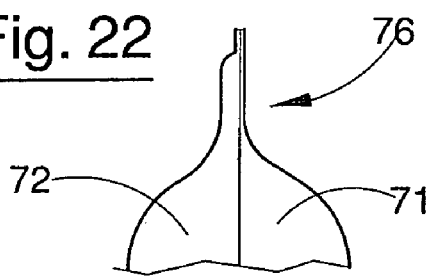

PROCESS AND PLANT FOR MANUFACTURING DOUBLE-POUCH CONTAINERS

REFERENCE TO RELATED APPLICATIONS

The present application is the national stage under 35 U.S.C. 371 of international application PCT/IB00/00599, filed May 5, 2000 which designated the United States, and which international application was published under PCT Article 21(2) in the English language.

TECHNICAL FIELD

Specifically, though not exclusively, the invention is usefully applied for packaging food products, pharmaceuticals, cosmetic and detergent products in the form of creams, pastes, liquids, powders, granules and hot-packed liquid products which solidify on cooling.

BACKGROUND ART

Reference is especially made to a container having two substantially similar pouches facing one another, provided with a pair of external walls and a central wall joined at least along a part of its perimeter to the external walls, thus defining the pouches.

US patents U.S. Pat. No. 4,254,910 and U.S. Pat. No. 5,170,886 teach containers of the above-described type which are used for packing liquids, especially perfumes which are then transported as gas in an air medium in order to disperse about a room. The containers comprise a central wall which is permeable to gases and which is associated to the gas-impermeable external walls in such a way as to be removable.

In FR 2755673, which discloses a process as in the preamble of claim 1, a sachet type of container is formed from two sheets of plastic which are welded together and between which a product is contained. A rigid median film forms a partition for dividing the container into two distinct compartments. The partition extends beyond the perimeter delimited by the compartments in order to provide a zone outside the compartments to form a support. The sachet type container contains two components which can be subsequently mixed to produce a product.

In U.S. Pat. No. 5,724,789 a multi-compartment dispensing package is manufactured by feeding three sheetings of heat sealable flexible film through a form-and-fill packaging instrumentation including an assembly dividing one sheet into two halves which become outer walls. The peripherally sealed, juxtaposed, multi-compartment, flexible package includes a pair of outer walls and a separator wall disposed between the outer walls for dividing the package into a plurality of compartments. The package is adapted to be torn open to simultaneously dispense and admix flowable material disposed within each of the compartments.

WO 98/26997 discloses a process for manufacturing a multicompartment sachet wherein two webs are fed horizontally into a forming station into which are inserted several vacuum ports. One web forms the outer walls of a sachet and the other web forms a dividing sheet.

The main aim of the present invention is to provide a process for forming containers with double pouches of the above-indicated type, which process is relatively rapid and economical.

An advantage of the invention is that it makes available a double pouch container which is particularly suitable for dispensing two different products at the same time—which products are kept separate until the moment they are dispensed.

A further advantage of the invention is to provide a double-pouch container for two products, which can be placed in a room and while there dispense and disperse in the air, over a period of time, the two products contained in it; the two products can also be dispensed in a determined order.

A further advantage is that a double-pouch container for two single-dose products is provided, so that one of the products can be consumed while the other remains sealed and available for consumption at a later date.

A further advantage is that a double-pouch container is provided for one product, which means that the product can be directly consumed while held in the hand. These aims and advantages and others besides are all attained by the present invention, as it is characterised in the claims that follow.

Further characteristics and advantages of the present invention will better emerge from the detailed description that follows of some preferred but non-exclusive embodiments of the invention, illustrated purely by way of non-limiting examples in the accompanying figures of the drawings, in which:

FIG. 11 is a schematic perspective view of a part of the plant of FIG. 1;

FIG. 12 is a perspective view of a plurality of containers formed by the plant:

FIG. 19 shows a side view of a fourth container made according to the invention;

FIG. 20 shows section XX—XX of FIG. 19;

FIG. 21 shows section XXI_XXI of FIG. 19;

FIG. 22 shows section XXII—XXII of FIG. 19;

FIG. 23 is a side view of a fifth container made according to the invention.

DISCLOSURE OF INVENTION

Figure 1:
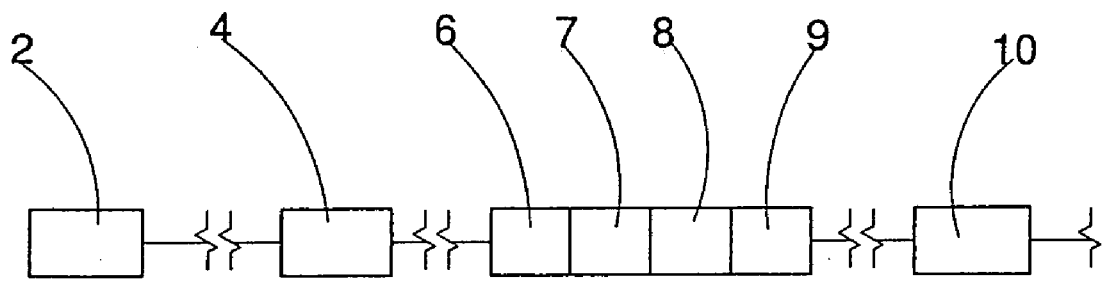
FIG. 1 is a block diagram of a plant for forming double-pouch containers in heat-formable and heat-weldable material, according to the invention.
Figure 2:
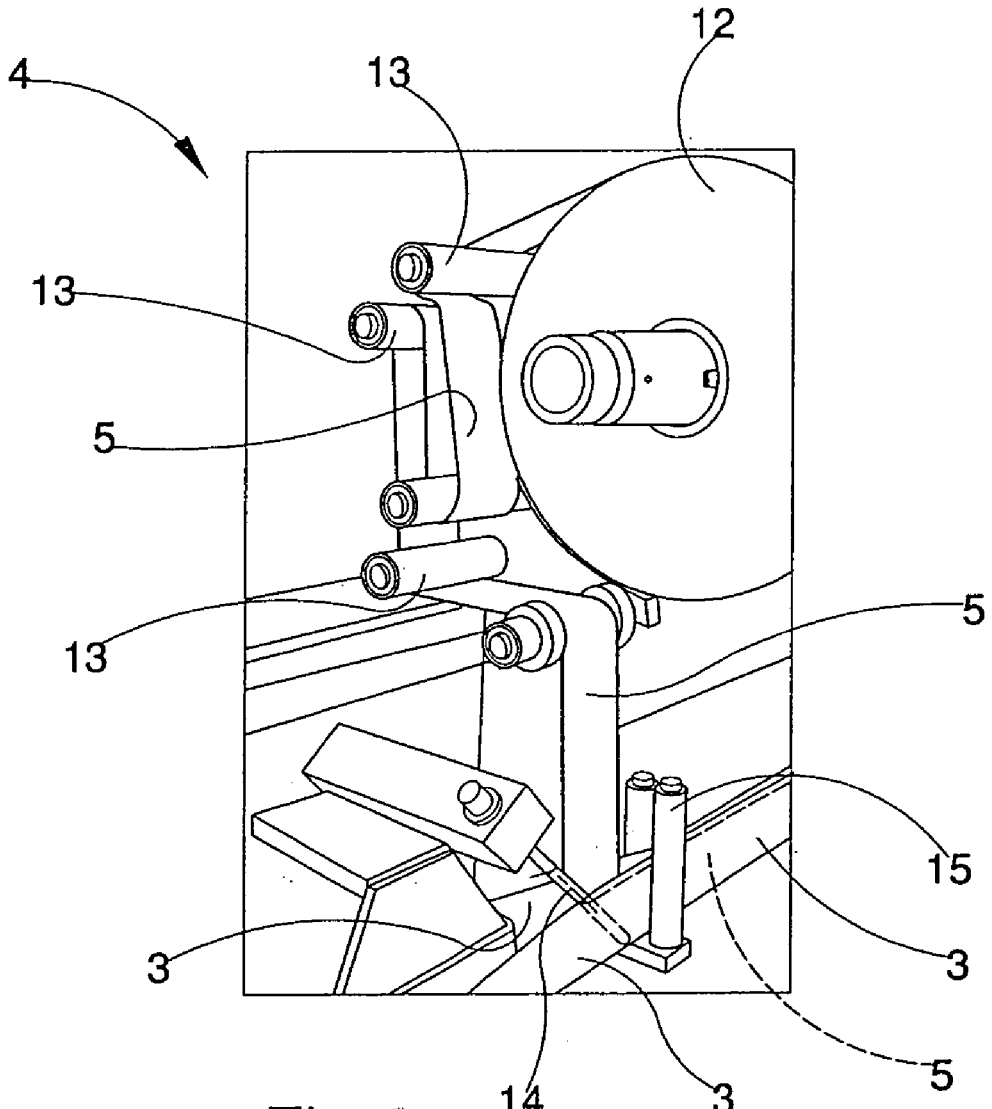
FIG. 2 is a perspective view of the infeeding station for the central ribbon of the plant of FIG. 1.
Figure 3:
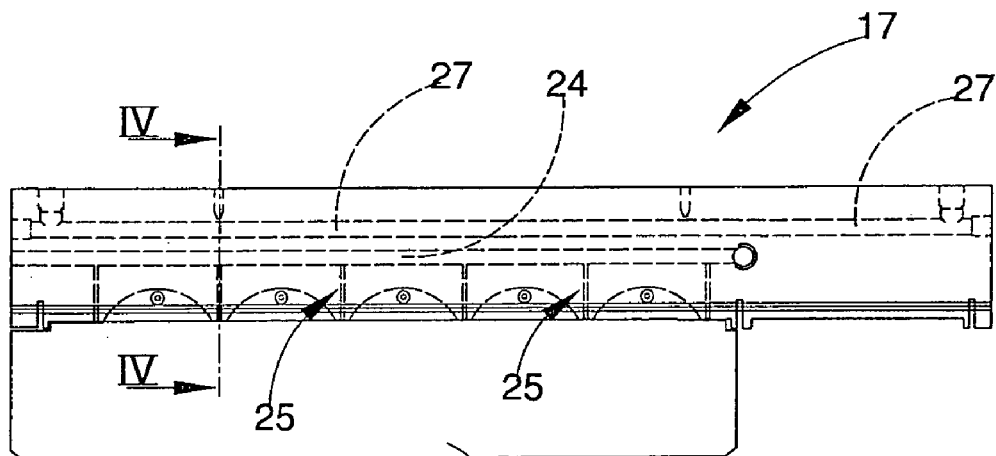
FIG. 3 is a lateral view of the manifold of the injector group of the plant of FIG. 1.
Figure 4:
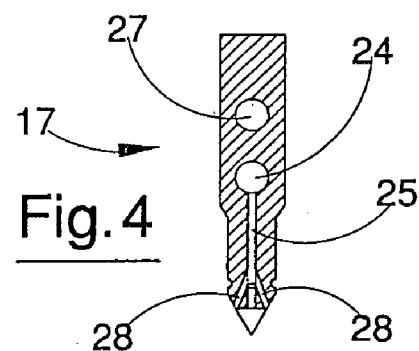
FIG. 4 is a section according to line IV—IV of FIG. 3.
Figure 5:
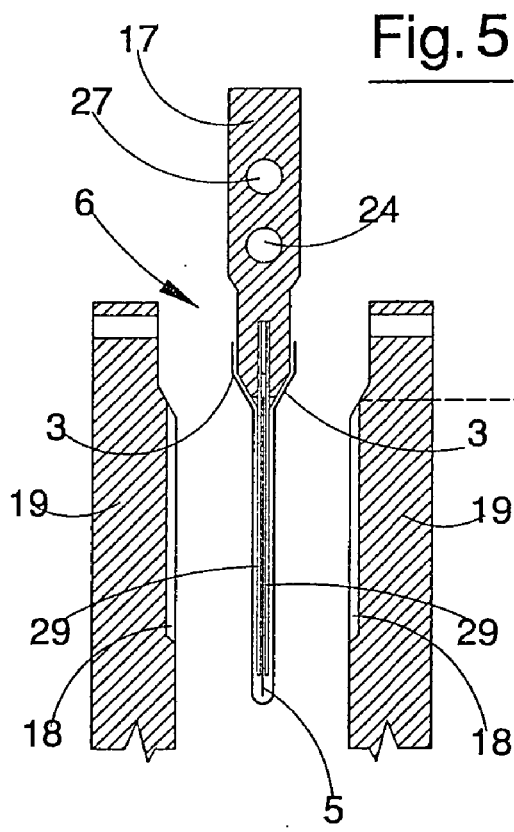
FIG. 5 is a schematic is a schematic view in section of a pre-heating station of the plant of FIG. 1.
Figure 6:
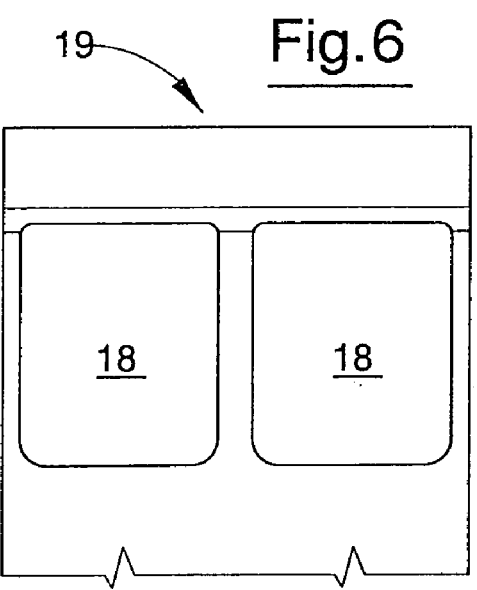
FIG. 6 is a schematic frontal view of a half-mould of the station of FIG. 5.
Figure 7:
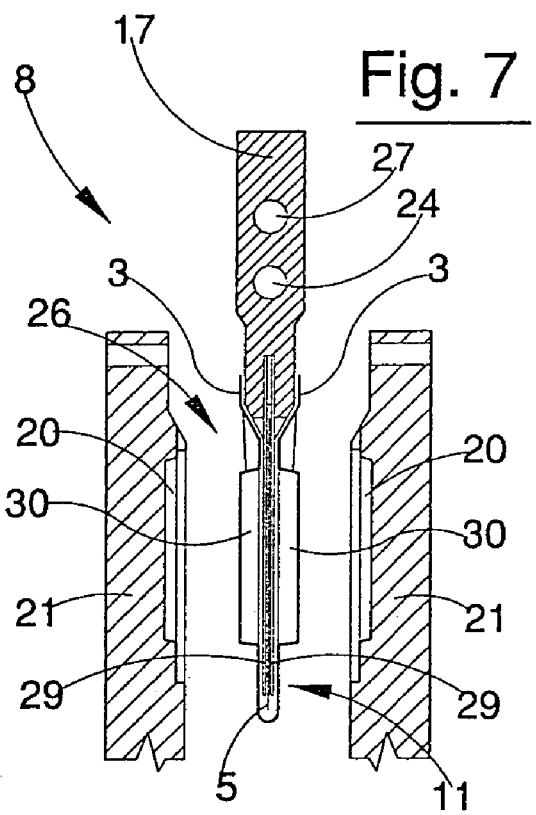
FIG. 7 is a schematic view in section of the forming station of FIG. 1.
Figure 8:
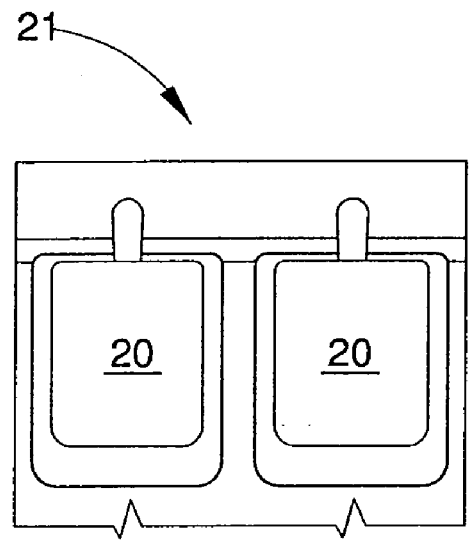
FIG. 8 is a schematic frontal view of a half-mould of the forming station of FIG. 7.
Figure 9:
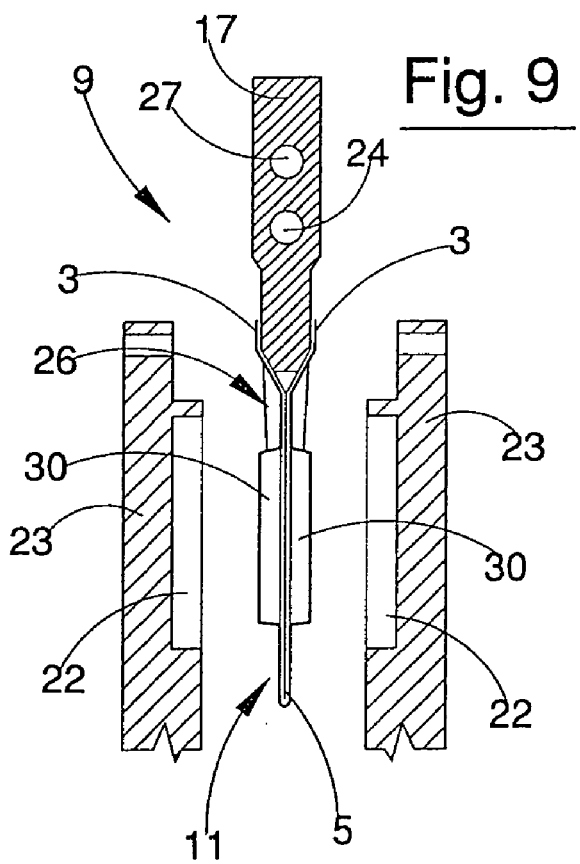
FIG. 9 is a schematic view in section of the welding station of the plant of FIG. 1.
Figure 10:
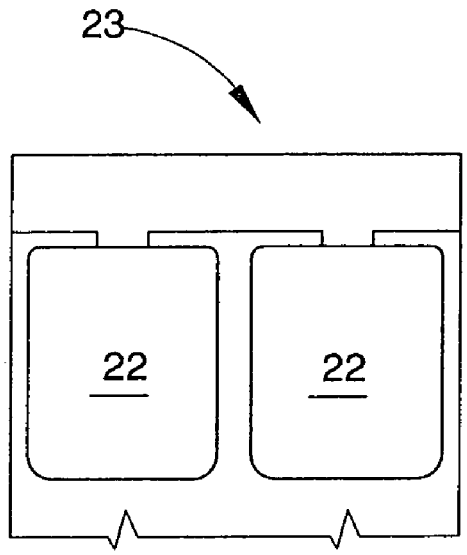
FIG. 10 is a schematic frontal view of a half-mould of the welding station of FIG. 9.

With reference to the above-mentioned figures of the drawings from 1 to 12, 1 denotes in its entirety a plant for forming double-pouch containers in heat-formable and heat-weldable material.

The plant 1 comprises a feeding and folding station 2 which supplies a film of plastic material which film is separated into two external ribbons 3, situated side-by-side and joined at the bottom; the plant further comprises an infeeding station 4 of a centrally-arranged ribbon 5 i.e. arranged between the external ribbons 3; the plant further comprises a first and a second preheating station 6 and 7 for the external ribbons 3, a welding station 9 for the external ribbons 3 and the central ribbon 5, and a cooling station 10 for the formed and welded containers 11.

The external ribbons 3 in arrival from the feeding and folding station 2 are kept in a substantially vertical and slightly separated position and advance continuously in a horizontal line.

The infeeding station 4 superiorly comprises a transversal reel 12 for feeding the central ribbon 5 and a plurality of horizontal rollers 13 for keeping the central ribbon 5 stretched during the unwinding of the reel 12 and the vertical insertion from above of the central ribbon 5 into the space between the two external ribbons 3, which as mentioned are kept slightly apart.

Advantageously the insertion of the central ribbon 5 between the two external ribbons 3 is favoured by the inclusion of an inclined fixed spindle 14, which, located interiorly of the advancement line of the external ribbons 3, receives the central ribbon 5 from above and deviates it in order to insert it continuously between the separated external ribbons 3.

Two vertical rollers 15, arranged downstream of the spindle 14 and externally of the external ribbons 3, receive the external ribbons 3 with the central ribbon 5 already inserted between them and compacts the set of ribbons 3 and 5 with the help of a plurality of pliers 16 distributed along the advancement line.

At the preheating stations 6 and 7, the forming station 8 and the welding station 9, a forming fluid is introduced, for example hot pressurised air, which is inserted between the external ribbons 3 through an injector group equipped with a manifold 17 which is interpositioned between the half-moulds of the various stations working laterally.

The preheating stations 6 and 7 comprise a mould which has compartments 18 that are sufficient to keep the external ribbons 3 separated while at the same time they adhere to the walls of the compartments 18 by effect of the forming fluid inserted during the closing stage of the relative half-moulds 19.

The forming station 8 comprises a mould which is provided with compartments 20 afforded in the relative half-moulds 21, which latter are shaped correspondingly to the final shape of the finished containers 11.

The welding station 9 comprises a mould which is provided with compartments 22 afforded in half-moulds 23, in which the already-formed containers are housed.

The manifold 17 has a longitudinal blind hole 24 for supplying the fluid, and communicates through a plurality of transversal pipes 25 with the mouths 26 of the containers 11. The manifold 17 is preferably also provided with a water cooling circuit 27 which prevents any container overheating at the various stations.

The pipes 25 have one end located at the mouths 26, which end is closed and in communication with the mouths through two lateral nozzles 28 which enable uniform distribution of the forming fluid between the external ribbons 3.

At the position of the heating stations 6 and 7 and the forming station 8, the manifold 17 inferiorly exhibits two separating blades 29, positioned vertical, distanced one from another and reciprocally aligned, which blades 29 insert between the central ribbon 5 and the external ribbons 3.

The blades 29 enable the external ribbons 3 to be preheated and thus the containers 11 to be formed without the central ribbon 5 being unduly heated, so preventing any formation of blisters, air pockets and the like due to excessive heat exposure.

The welding station 9 is provided with heat-welding equipment, of well-known type and not illustrated, which weld the central ribbon 5 and the pair of external ribbons at the edges of the containers 11.

The forming fluid introduced in the various stations determines the expansion of the external ribbons 3, made of plastic material, against the opposite hollow compartments afforded in the two half-moulds of the respective moulds.

The moulds are maintained at a temperature which softens the material, while being sufficiently low to prevent the external ribbons 3 from welding to the moulds themselves. For the same reason the gripping force of the moulds must be sufficiently high to prevent the fluid from escaping but not such as to weld the external ribbons 3 together.

The stations upstream of the forming station 8 operate at gradually increasing temperatures up until the softening temperature of the external ribbon 3 material is reached. The forming station 8 operates at lower temperatures than the upstream stations so as to stabilise the shape of the containers under formation. The cooling station 10 downstream of the welding station 9 concludes the deformation of the external ribbons 3 and the subsequent stabilisation of the welded surface.

Advantageously, downstream of the cooling station 10 there will be a container filling station, a filled container-mouth permanent welding station and a cutting station for separating one or more adjacent containers in transversal planes which are perpendicular to the forming direction.

The described plant actuates a process for forming double-pouch containers comprising the following stages: infeeding two continuous external ribbons 3, facing one another, in an advancement direction, to at least one insertion zone where a third, central ribbon 5 is inserted between the external ribbons 3; forming the pouches in the two external ribbons 3, after insertion of the central ribbon 5, by coupling the two external ribbons 3 to two half-moulds having compartments the shape of which corresponds to the shape of the finished pouches; welding the central ribbon 5 to the external ribbons 3 at the perimeter edges of the formed pouches.

The coupling of the external ribbons 3 to the two half-moulds is realised, after insertion of the central ribbon 5, by injecting a forming fluid between the external ribbons 3 in order to determine the expansion of the external ribbons 3 against the compartments of the half-moulds.

By using another plant (not illustrated), it would be possible to form the pouches on the external ribbons 3 by coupling the external ribbons 3 to two half-moulds before insertion of the central ribbon 5.

Preferably the two external ribbons are formed by folding a continuous film in order to produce a pair of side-by-side ribbons joined at their bottoms.

Preferably the central ribbon 5, unwound from a transversal reel, is inserted continuously from above between the two external ribbons 3, held slightly apart and advancing in a substantially horizontal direction.

In an embodiment of the process, at least two of the three ribbons are made of a material of known type which disintegrates by effect of one or more external agents.

The intermediate or central ribbon 5 can be considerably thinner than the two external ribbons without endangering the effectiveness of the seal and the integrity of the finished container.

The plant operates as follows.

The continuous external ribbons 3 of heat-formable and heat-weldable material are advanced from the feeding station 2, separated one from the other, to the infeeding station 4 of the central ribbon 5.

The central ribbon 5 is inserted between the external ribbons 3, the pack of ribbons is compacted and taken to the preheating stations 6 and 7 where the central ribbon 5 is isolated by the blades 29 and the external ribbons 3 are heated and slightly expanded by the action of a pressurised forming fluid in compartments of relative moulds.

On quitting the preheating stations 6 and 7, the external ribbons 3 proceed to the forming station 8, where they are expanded against the compartments of the mould in order to realise the walls of the container 11. The central ribbon 5 is kept isolated from this part of the process by the blades 29.

On leaving the forming station 8, the external ribbons 3 and the central ribbon 5 are taken to the welding station 9, where the external ribbons 3 and the central ribbon 5 are heat-welded along the perimeter edge of the containers 11.

When the containers 11 leave the welding station 9, by now formed and welded, they are sent to the cooling station 10 and thereafter to the filling station, the closing station and the mouth permanent-welding station, and finally to the cutting station.

The following, with reference to figures from 13 to 23, is a description of various containers which can preferably be obtained using the plant and the process of the invention.

Figure 13:
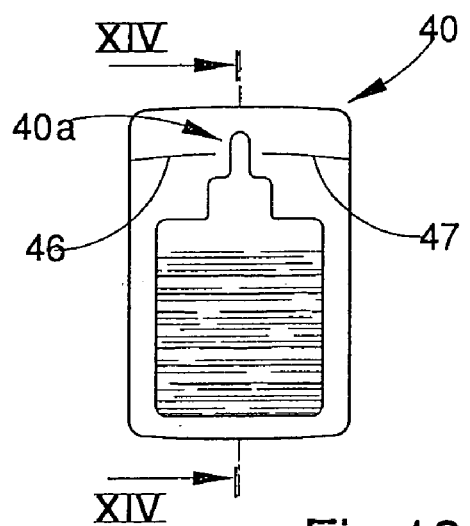
FIG. 13 is a side view of a first container made according to the invention.
Figure 14:
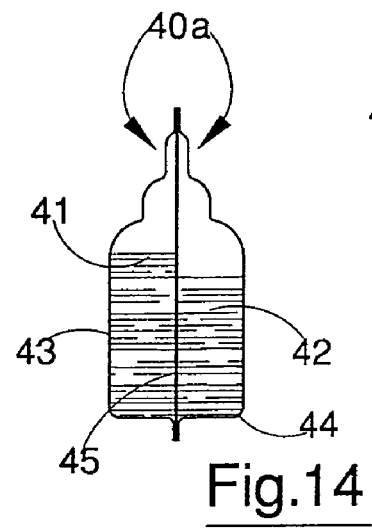
FIG. 14 is section XIV—XIV of FIG. 13.

FIGS. 13 and 14 illustrate a container 40 having two closed pouches 41 and 42 which are basically similar, face one another, are isolated one from the other, with each of them containing a product.

The container 40 comprises a pair of external walls 43 and 44 and a separator central wall 45 coupled along its perimeter to the external walls 43 and 44, thus forming the pouches. The central wall 45 separating the two pouches is made of a material which is impermeable with regard to the two products contained in the pouches, and keeps the products apart up until the moment of use of at least one of them.

The products in the pouches might be two different ones, which are mixed together only when the container is opened. The products might be, for example, two medical substances which interact on mixing; or they might be two single components in a bi-component product (for example a toothpaste) which is combined only at moment of use.

Figure 14A:
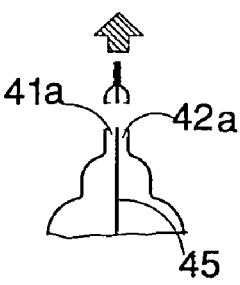
FIG. 14a shows the open container.

The container exhibits at least one breakable end 40a, which relates to both pouches and whose fracture determines the opening of the adjacent outlet mouths 41a and 42a (FIG. 14a), one for each pouch, separated one from the other by the central wall 45 but through which the products contained in the pouches can flow out.

The external walls 43 and 44 can be made of a flexible material, and the outflow of the two products (preferably liquid or paste) can be achieved, after breaking the end 40a, by squeezing the external walls 43 and 44.

The breakable end 40a can be manually broken by the user. In the present case the end 40a comprises two parts of pouch, each having a narrower section with respect to the rest of the pouch. These narrower parts are side-by-side and separated by the central wall 45.

The breakable end 40a has two fracture lines 46 and 47 predisposed to facilitate the breakage of the end 40a. Each fracture line comprises a recess cut into the peripheral part of the container, in a zone where the three walls which define the pouches are coupled one to another. The recesses preferably go all the way through the plastic, as in the illustrated embodiment (which means that they cut both the external walls and the central wall) but can also be only partially penetrating. The recesses are situated at the opposite sides of the breakable end 40a and extend almost up to the end 40a itself.

The recesses are made at a cutting station predisposed downstream of the final welding station of the filled containers.

The double-pouch container is especially suitable for simultaneous dispensing of two different products kept separate until the moment of dispensing.

In an embodiment which is not illustrated, the breakable end 40a can exhibit two recesses, each made in a respective external wall 43 and 44, to enable separate opening of the two pouches, first one and then the other. The operation is facilitated if the central wall 45 is made in a flexible material.

In another embodiment, the opening of the two pouches can be realised, rather than by breaking a part of the container, by using a closure device (for example a cap, a top, a tongue) applied to the container after it has been filled.

The three walls 43, 44 and 45 are preferably made of a heat-formable and heat-weldable material, for example plastic.

Figure 15:
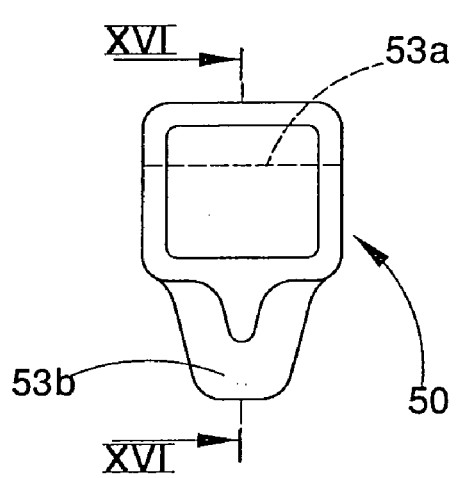
FIG. 15 is a lateral view of a second container made according to the invention.
Figure 16:
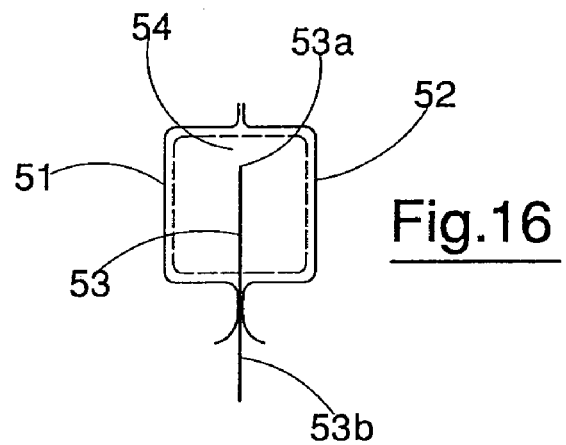
FIG. 16 is section XVI—XVI of FIG. 15.

FIGS. 15 and 16 illustrate a container 50 having two external walls 51 and 52 which externally delimit the pouches and which are coupled to a central wall 53 in such a way that they can be peeled away.

Figure 16A:
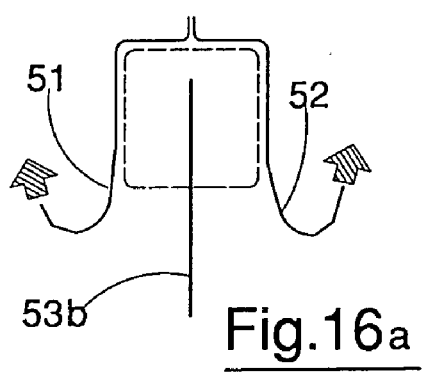
FIG. 16a shows the open container.

The central wall 53 exhibits one end 53a which is not coupled to the external walls, but which terminates internally of the pouches, thus leaving an opening 54 which sets the pouches in communication with each other. At the opposite end 53b the central wall 53 functions as a handle (once the external walls have been peeled away) so that the product can easily be eaten (FIG. 16a); thus the central wall 53 functions as a support for the product.

Peeling away the external walls is made easier by the presence of two tongues which are none other than two ends of the external walls not welded to the central wall 53.

Figure 17:
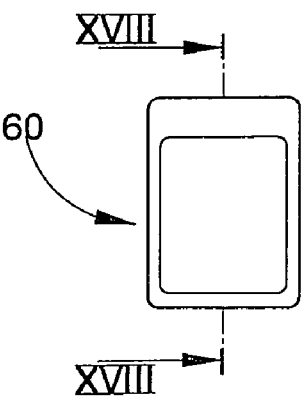
FIG. 17 is a side view of a third container made according to the invention.
Figure 18:
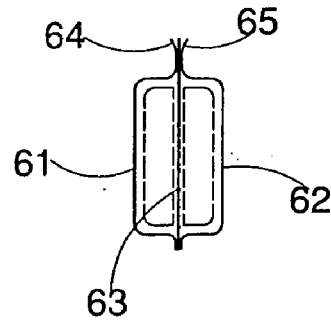
FIG. 18 is section XVIII—XVIII of FIG. 17.

FIGS. 17 and 18 illustrate a third type of container 60 in which the external walls 61 and 62 are coupled to the central wall 63 so that they can be peeled away.

The central wall 63 is made of a material which protects the products contained in the pouches from the outside environment, especially if the products are in the food category. The material of the central wall 63 is also impermeable to any odours in the atmosphere, or smells issued by the products themselves, so that the food qualities of the products are well-protected.

The container 60 is opened by peeling away the external walls from the central wall 63. Two tongues 64 and 65, none other than two ends of the external walls not welded to the central wall, facilitate container opening.

The container is made such that first one external wall, then the other, can be peeled away. The container is therefore convenient for containing two single doses of a same product, so that one can be consumed and the other saved for later consumption.

In the above-described double-pouch containers, it can be arranged that two of the three walls defining the pouches are made of a material, of known type, which disintegrates by effect of one or more determinant external agents (for example, chemicals, mechanical agents, atmospheric agents, heat factors, etc.) So that the product in at least one of the pouches is released to the outside environment. In particular, all three walls can be made of a material liable to disintegrate. The material could be, for example, water-soluble.

At least one of the three walls can be made of a disintegrating material having different characteristics from the disintegrating material of which at least one other of the three walls is made. This different characteristic is preferably connected to the time needed to disintegrate, so that one of the products can be released to the outside before the other. The container might exhibit, for example, an external wall destined to disintegrate first, leaving the product in one of the pouches free to disperse into the atmosphere, while the other two walls will disintegrate later, freeing the other product after the first has carried out its activity.

Figures from 19 to 22 illustrate a container 70 having two basically similar closed pouches 71 and 72 which are face-to-face but isolated from each other, each of which contains a product.

The container 70 comprises a pair of external walls 73 and 74 and a separator central wall 75 coupled along its perimeter to the external walls, thus forming the pouches. The central wall separating the two pouches is made of an impermeable material which keeps the two products separate.

The products contained in the two pouches can be ones which are intended to combine, even if they are different to each other, perhaps at a distance of time, i.e. without mixing (for example, a single dose of shampoo followed by a dose of hair conditioner, which will be used immediately after the shampoo).

The container 70 exhibits at least two easy-break ends 76 and 77, separate and distanced one from the other, in which a first end 76 relates to one of the pouches 72 while a second end 77 relates to the other of the pouches 72. An easy-break end, associated to a pouch, comprises a relatively-narrow appendix of the pouch. The appendix is delimited by the separator central wall 75 and by one of the two external walls 73 or 74, while the other external wall, 74 or 73, in the zone situated at the other end from the appendix, is coupled to the central wall 75. Each appendix is cut in two by a respective fracture line 78. There are at least two fracture lines 78, one for each appendix. The fracture lines 78 do not intersect and are relatively distant from each other. The breakage of one of the two fracture lines 78 opens one of the two pouches, leaving the other pouch intact.

The user can open one pouch, for example pouch 71, by breaking only one of the ends, i.e. the second end 77, without running any risk of breaking the other end 76. The second end 77 is in a zone of the container where the central wall 75 and the external wall 74, which together define the pouch 72, are welded one to the other. Thus by breaking the second end 77 the pouch 72 remains sealed. A similar situation exists for the first end 76, which is situated in a zone of the container in which the central wall 75 and the external wall 73, which together define the pouch 71, are welded to each other.

FIG. 23 illustrates a container 80 which differs from container 70 in that the latter has a flat bottom 81 and can be set down independently on a surface. The two easy-break ends are at an opposite end from the bottom 81. During manufacture of this container the forming fluid is blown through an opening situated between the two easy-break ends, again at the opposite end from the bottom 81. 82 denotes the zone of the container 80 where during the forming operation the hole for introducing the forming fluid was situated. In container 70 of FIG. 19, the fluid introduction hole, denoted by 79, is located on an opposite side to the side where the easy-break ends 76 and 77 are situated.

Another type of container, not illustrated, which can be formed by the described plant, is made of heat-formable and heat-weldable material for products designed to emanate and disperse in a surrounding environment, such as perfumes and the like. The container comprises two pouches, separated by a central permeable wall. The pouches and the central wall are welded together along the perimetral edge.

The central wall can comprise an internal layer and two external films which are destined to be welded to the external walls of the pouches. The central wall is made of materials which render the adhesion force between the external films and the internal layer lower than the adhesion force between the external films and the external pouch walls after they have been welded together.

The two external films can be made of a gas-permeable plastic material. The internal layer uniting the two films can be a peelable resin. The adhesion force guaranteed by the peelable resin is lower than the welding force between the films and the external walls of the pouches, which results in the films being easily peelable.

The partial or total opening of the containers is done at the internal layer of the permeable central wall, making possible the emanation of the contents of the two pouches into the surrounding atmosphere.

This type of container is especially suitable for scenting closed environments, such as wardrobes, drawers, linen cupboards and so on. The container can be used both in vertical and horizontal configurations, do not require removal of a supplementary film, and have no permeable part in direct contact with shelves or other surfaces, as this part is internal of the pouches containing the product. Also, in comparison to other traditional products of the type and size, the present containers exhibit an emanation surface which is twice as big, as the scents exit at the same time from the two permeable films of the central wall welded to the respective pouches.

All of the above-described containers can be made with the separator central wall thinner than the plastic sheets from which the external walls are made. Thanks to this very thin central wall, a saving can be made in terms of material without weakening the sealing function of the container.

All of the above-described containers can be manufactured using the plant described in figures from 1 to 12, and all can be made using any one of the above-described processes.

What is claimed is:

1. A process comprising the following steps:
    advancing two continuous external webs, facing one another, in an advancement direction, to at least one insertion zone where a third, continuous central web is inserted between said external webs;
    forming pouches from said external webs and said central web, after inserting of said central web, by introducing, at a forming station, said external webs and said central web between half-mould compartments, having a shape corresponding to a final shape of said pouches, and injecting a forming fluid between said external webs and said central web through an opening so as to expand said external webs against said compartments;

welding said central web to said external webs along a peripheral zone of said pouches and along an outline of each pouch so as that said opening remains;

filling each pouch with a product through said opening at a filling station; and sealing each pouch by closing said opening.

2. A process according to claim 1, and further comprising interposing a pair of vertical separator blades between said central web and said external webs during said forming, said vertical separator blades being parallel to one another but spaced apart one from another.

3. A process according to claim 2, and further comprising preheating said external webs before said forming, during said preheating said pair of vertical separator blades being interposed between said central web and said external webs so as to prevent said central web from being preheated.

4. A process according to claim 1, and further comprising unwinding said central web from a transversal reel so as to insert continuously from above said central web between said external webs during said advancing in a horizontal direction.

5. A process according to claim 4, wherein said central web is unwound vertically from said reel and is deviated so as to be inserted continuously between said external webs.

6. A process according to claim 1, wherein after said inserting, said external webs and said central web are compacted together.

7. A process according to claim 1, wherein said external webs are obtained by folding of a continuous film, so as to define a pair of webs situated side-by-side and reciprocally connected at the bottom thereof.

8. A process according to claim 1, wherein at least two of said webs are made of a material which disintegrates by effect of one or more external agents.

9. An apparatus comprising:

a feeding station intended for feeding two continuous external webs, facing one another, in an advancement direction;

an inserting station intended for inserting a central web between said external webs;

a forming station provided with half-mould compartments and arranged for forming pouches from said external webs and said central web by shaping said external webs according to a shape of said compartments, the forming station being further provided with an injector group which serves to inject a forming fluid between said external webs and said central web so as to expand said external webs against said compartments;

a welding station so configured as to weld said central web to said external webs along a peripheral zone of said pouches and along an outline of each pouch so as to define an opening through which said forming fluid is injected;

a filling station arranged for filling each pouch with a product through said opening; and a sealing station intended for sealing each pouch.

10. An apparatus according to claim 9, and further comprising a preheating station for preheating said external webs, said injector group comprising a manifold extending through said preheating station, said forming station and said welding station.

11. An apparatus according to claim 10, wherein at said preheating station and at said forming station said manifold is provided at the bottom with a pair of vertical separating blades, parallel to each other and set at a distance one from another, said vertical separating blades being intended to be positioned between said central web and said external webs to prevent heating of said central web.

12. An apparatus according to claim 10, wherein said manifold comprises a longitudinal blind-hole for feeding said forming fluid between said external webs and said central web through a plurality of transversal pipes.

13. An apparatus according to claim 12, wherein said transversal pipes comprise at least two lateral nozzles arranged at opposite sides of said central web.

14. An apparatus according to claim 10, wherein said manifold is provided with a cooling circuit in which water may circulate to prevent overheating of said webs.

15. An apparatus according to claim 9, wherein said inserting station is provided at the top with a transversal reel for continuously feeding said central web from above between said external webs while the latter are advancing mutually separated in a horizontal direction.

16. An apparatus according to claim 15, wherein said inserting station comprises a fixed inclined spindle arranged for receiving said central web vertically unwound from said reel and for deviating said central web so as to insert it continuously between said external webs.

17. An apparatus according to claim 9, and further comprising a compacting arrangement for compacting together said external webs and said central web, downstream of said inserting station.

18. An apparatus according to claim 17, wherein said compacting arrangement is constituted by pairs of rollers and pliers distributed along a path of said external webs and of said central web in said advance direction.

* * * * *